(12) United States Patent
Gai et al.

(10) Patent No.: US 12,174,474 B2
(45) Date of Patent: Dec. 24, 2024

(54) DISPLAY MODULE AND MEDICAL SPLICED DISPLAY SYSTEM

(71) Applicants: BEIJING BOE DISPLAY TECHNOLOGY CO., LTD., Beijing (CN); BOE TECHNOLOGY GROUP CO., LTD., Beijing (CN)

(72) Inventors: Xin Gai, Beijing (CN); Bing Wang, Beijing (CN); Xingliang Li, Beijing (CN); Yawei Chen, Beijing (CN); Guojian Qu, Beijing (CN); Wenqian Luo, Beijing (CN); Jingrui Ren, Beijing (CN); Tianyi Feng, Beijing (CN); Weibiao Geng, Beijing (CN); Qian Cheng, Beijing (CN); Hetao Wang, Beijing (CN); Tianyang Han, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/037,308

(22) PCT Filed: May 11, 2022

(86) PCT No.: PCT/CN2022/092197
§ 371 (c)(1),
(2) Date: May 16, 2023

(87) PCT Pub. No.: WO2023/216135
PCT Pub. Date: Nov. 16, 2023

(65) Prior Publication Data
US 2024/0345430 A1    Oct. 17, 2024

(51) Int. Cl.
G02F 1/1333    (2006.01)
G02F 1/1335    (2006.01)

(52) U.S. Cl.
CPC ...... G02F 1/13332 (2021.01); G02F 1/13336 (2013.01); G02F 1/133528 (2013.01)

(58) Field of Classification Search
CPC .......... G02F 1/133317; G02F 1/13332; G02F 1/13336; G02F 1/133528
See application file for complete search history.

(56) References Cited

U.S. PATENT DOCUMENTS

2011/0128465 A1*  6/2011  Park ................ G02F 1/133308
                                                 349/61
2014/0132880 A1*  5/2014  Zhao ............... G02F 1/133308
                                                 349/58
(Continued)

FOREIGN PATENT DOCUMENTS

CN    101441355 A    5/2009
CN    203641994 U    6/2014
(Continued)

*Primary Examiner* — James A Dudek
(74) *Attorney, Agent, or Firm* — Nath, Goldberg & Meyer; Joshua B. Goldberg

(57) ABSTRACT

The present disclosure provides a display module and a medical spliced display system. The display module includes: a display panel; a back plate including a bottom wall and a side frame connected to each other to define an accommodating space; and a frame including a retaining wall and a supporting platform and an insert on the retaining wall; at least a portion of the retaining wall surrounds the side frame; the supporting platform extends toward the inside of the accommodating space for supporting the display panel; the insert is on a side of the side frame facing the accommodating space, to embed the side frame between the retaining wall and the insert.

25 Claims, 11 Drawing Sheets

(56) References Cited

U.S. PATENT DOCUMENTS

2019/0353950 A1* 11/2019 Jin ........................... H05K 5/03
2020/0033662 A1* 1/2020 Kawazoe .......... G02F 1/133602
2021/0200017 A1* 7/2021 Lee ..................... G02B 6/0088

FOREIGN PATENT DOCUMENTS

| | | |
|---|---|---|
| CN | 104021732 A | 9/2014 |
| CN | 203907500 U | 10/2014 |
| CN | 104950498 A | 9/2015 |
| CN | 106707620 A | 5/2017 |
| CN | 105223723 B | 9/2019 |
| CN | 214896101 U | 11/2021 |
| CN | 113990209 A | 1/2022 |
| CN | 215895168 U | 2/2022 |
| JP | 2007157465 A | 6/2007 |

* cited by examiner

DISPLAY MODULE AND MEDICAL SPLICED DISPLAY SYSTEM

CROSS-REFERENCE TO RELATED APPLICATION

This is a National Phase Application filed under 35 U.S.C. 371 as a national stage of PCT/CN2022/092197, filed on May 11, 2022, the contents of which are incorporated herein in their entirety by reference.

TECHNICAL FIELD

The present disclosure relates to the field of display technology, in particular to a display module and a medical spliced display system.

BACKGROUND

A liquid crystal display device includes: a display panel and a backlight module for providing backlight for the display panel. The backlight module includes: a back plate, a light-emitting device, an optical film group and a frame. The back plate is provided with an accommodating space in which at least portions of the light-emitting device and the optical film group are provided. The frame is arranged around the accommodating space and used for bearing the display panel.

SUMMARY

The present disclosure provides a display module, including: a display panel; a back plate, including a bottom wall and a side frame connected to each other to define an accommodating space; and a frame, including a retaining wall and a supporting platform on the retaining wall, wherein at least a portion of the retaining wall surrounds the side frame; the supporting platform extends toward the inside of the accommodating space and is configured to support the display panel; the frame further includes an insert connected to the retaining wall, and the insert is a side of the side frame facing the accommodating space, to embed the side frame between the retaining wall and the insert; wherein the retaining wall includes a plurality of retaining wall sidewalls on different sides of the accommodating space, respectively, and at least one of the plurality of retaining wall sidewalls is provided thereon with the insert and includes at least one notch portion opposite to the insert thereon; and the side frame includes a plurality of back plate sidewalls on different sides of the accommodating space, respectively; at least one of the plurality of back plate sidewalls includes a first sub-sidewall and a second sub-sidewall connected to each other, the first sub-sidewall is opposite to a corresponding retaining wall sidewall, the second sub-sidewall is opposite to the insert, and at least a portion of the second sub-sidewall is in the notch portion.

In some embodiments, a surface of the first sub-sidewall facing the accommodating space and a surface of the second sub-sidewall facing the accommodating space are on two planes, respectively; and the two planes have a first distance therebetween, and the first distance is between 0.5 mm and 1 mm.

In some embodiments, a surface of the second sub-sidewall facing away from the accommodating space and a surface of the retaining wall sidewall facing away from the accommodating space are substantially on a same plane.

In some embodiments, the plurality of retaining wall sidewalls include: a plurality of first retaining wall sidewalls extending along a first direction and a plurality of second retaining wall sidewalls extending along a second direction, the first direction intersects the second direction, and a length of each first retaining wall sidewall is greater than a length of each second retaining wall sidewall; and the insert is only on the first retaining wall sidewall.

In some embodiments, the plurality of first retaining wall sidewalls include two first retaining wall sidewalls arranged side by side in the second direction, and each first retaining wall sidewall is provided with the insert thereon; and positions where the inserts are provided on the two first retaining wall sidewalls are mirror-symmetric with respect to a reference axis extending along the first direction.

In some embodiments, the inserts of the frame includes a plurality of insert groups, each insert group includes at least one insert, and the at least one insert in a same insert group is opposite to a same second sub-sidewall.

In some embodiments, each insert group includes at least two inserts disposed at intervals; and a farthest distance between two inserts farthest from each other in each insert group is greater than or equal to 24 mm.

In some embodiments, the plurality of retaining wall sidewalls include: a plurality of first retaining wall sidewalls extending along a first direction and a plurality of second retaining wall sidewalls extending along a second direction, the first direction intersects the second direction, and a length of each first retaining wall sidewall is greater than a length of each second retaining wall sidewall; and multiple insert groups are on each first retaining wall sidewall.

In some embodiments, on each first retaining wall sidewall, a distance from one end of the first retaining wall sidewall to a center of an insert group adjacent to the one end and a distance from the other end of the first retaining wall sidewall to a center of an insert group adjacent to the other end are both in a range from $1/10$ to $1/4$ times of H; and a center-to-center distance between any two adjacent insert groups is in a range from $1/5$ to $1/2$ times of H; and wherein H is the length of the first retaining wall sidewall.

In some embodiments, on each first retaining wall sidewall, a distance from one end of the first retaining wall sidewall to a center of an insert group adjacent to the one end and a distance from the other end of the first retaining wall sidewall to a center of an insert group adjacent to the other end are both less than or equal to 100 mm; and a center-to-center distance between any two adjacent insert groups is less than or equal to 150 mm.

In some embodiments, on each first retaining wall sidewall, a distance from one end of the first retaining wall sidewall to a center of an insert group adjacent to the one end and a distance from the other end of the first retaining wall sidewall to a center of an insert group adjacent to the other end are both less than or equal to 100 mm; and a center-to-center distance between any two adjacent insert groups is in a range from $1/5$ to $1/2$ times of the length of the first retaining wall sidewall.

In some embodiments, the insert groups are uniformly distributed on each first retaining wall sidewall.

In some embodiments, the insert includes a first insert portion and a second insert portion extending towards the bottom wall; and a thickness of the second insert portion gradually becomes smaller as getting closer to the bottom wall.

In some embodiments, the second insert portion has a height in a range from $1/3$ to $1/2$ of a height of the insert.

In some embodiments, a slot is provided at an end of the second sub-sidewall away from the bottom wall; and the display module further includes an optical film, including a main part and a lug on the main part; the main part is in the accommodating space, and the lug is inserted into the slot.

In some embodiments, a depth by which the lug is inserted into the slot is greater than or equal to half a thickness of the second sub-sidewall.

In some embodiments, an orthographic projection of the optical film on a plane where the bottom wall is located and an orthographic projection of the supporting platform on the plane where the bottom wall is located are overlapped with each other, and a width of an overlapped area is greater than or equal to 0.8 mm.

In some embodiments, the optical film further includes an avoidance notch on the main part; and a portion of the insert is in the avoidance notch.

In some embodiments, a surface of the bottom wall facing away from the accommodating space is provided thereon with a first reinforcing rib and a plurality of second reinforcing ribs which are not overlapped with each other; the first reinforcing rib has a first annular boundary, and the second reinforcing ribs have second annular boundaries, each of which is within an area surrounded by the first annular boundary; and wherein the display module is vertical display module that has a height greater than its width in use; and the plurality of second reinforcing ribs include: a second top reinforcing rib, a second bottom reinforcing rib, and a plurality of second middle reinforcing ribs, and the second top reinforcing rib and the second bottom reinforcing rib are on two sides of the plurality of second middle reinforcing ribs along a height direction of the display module, respectively.

In some embodiments, the display panel includes: an array substrate, an opposite substrate, a liquid crystal layer and a first polarizer; the opposite substrate is on a side of the array substrate facing away from the bottom wall of the back plate; and the liquid crystal layer is between the array substrate and the opposite substrate; the first polarizer is on a side of the array substrate facing the bottom wall, and an orthographic projection of the first polarizer on the bottom wall does not overlap with an orthographic projection of the supporting platform on the bottom wall; and the supporting platform has a first edge away from the retaining wall, and an orthographic projection of the first edge on the bottom wall surrounds an orthographic projection of a display area on the bottom wall; the orthographic projection of the first edge on the bottom wall and the orthographic projection of the display area on the bottom wall have a second distance therebetween; and the second distance d2 corresponding to at least one side of the accommodating space satisfies:

$$d2 \geq (t3 - t2) * \tan\alpha + (t1 + t2) * \tan\left(\arcsin\left(\frac{\sin\alpha}{n}\right)\right) + T$$

where $\alpha$ is the maximum visual angle on at least one side of the display module; t1 is a sum of thicknesses of the array substrate and the liquid crystal layer; t2 is a thickness of the first polarizer; t3 is a thickness of the supporting platform; n is a refractive index of a substrate of the array substrate; and T is an accumulated tolerance of the display module during production, and T≥0.33.

In some embodiments, $\alpha$ is 45°.

In some embodiments, the display panel includes: an array substrate, an opposite substrate and a first polarizer; the opposite substrate is on a side of the array substrate facing away from the bottom wall of the back plate; and the first polarizer is on a side of the array substrate facing the bottom wall; the supporting platform has a first edge away from the retaining wall, and an orthographic projection of the first edge on the bottom wall surrounds an orthographic projection of a display area on the bottom wall; the orthographic projection of the first edge on the bottom wall and the orthographic projection of the display area on the bottom wall have a second distance therebetween; and wherein in the case that $\alpha$ is 45° and n is 1.52, the second distance d2 corresponding to at least one side of the accommodating space is greater than or equal to 1.53 mm; $\alpha$ is the maximum visual angle on at least one side of the display module; and n is a refractive index of a substrate of the array substrate.

In some embodiments, the retaining wall includes a plurality of retaining wall sidewalls on different sides of the accommodating space, respectively; at least a portion of each retaining wall sidewall is on a side of the side frame facing away from the accommodating space; and the insert is arranged on the at least one retaining wall sidewall; the display module further includes a front frame, including a plurality of front frame sidewalls, and a shielding part connected to the plurality of front frame sidewalls; a plurality of front frame sidewalls surround the frame; the shielding part is on a side of the display panel facing away from the bottom wall, an orthographic projection of the shielding part on the display panel is in a peripheral area of the display panel; and wherein an outer boundary of the shielding part corresponding to the retaining wall sidewall provided with the insert and a boundary of a display area have a third distance therebetween, and the third distance is between 4.8 mm and 5.6 mm.

The present disclosure also provides a medical spliced display system, including a plurality of display modules spliced together, and each display module is the above display module.

In some embodiments, at least two of the plurality of display modules are arranged along the second direction and spliced together.

BRIEF DESCRIPTION OF DRAWINGS

The accompanying drawings, which are provided for a further understanding of the present disclosure and constitute a part of this specification, are for explaining the present disclosure together with the embodiments of the present disclosure, but are not intended to limit the present disclosure. In the drawings.

DETAIL DESCRIPTION OF EMBODIMENTS

The detailed description of the present disclosure will be described in further detail below with reference to the accompanying drawings. It should be understood that the detailed description described here is only used to illustrate and explain the present disclosure, and does not limit the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Figure 1:
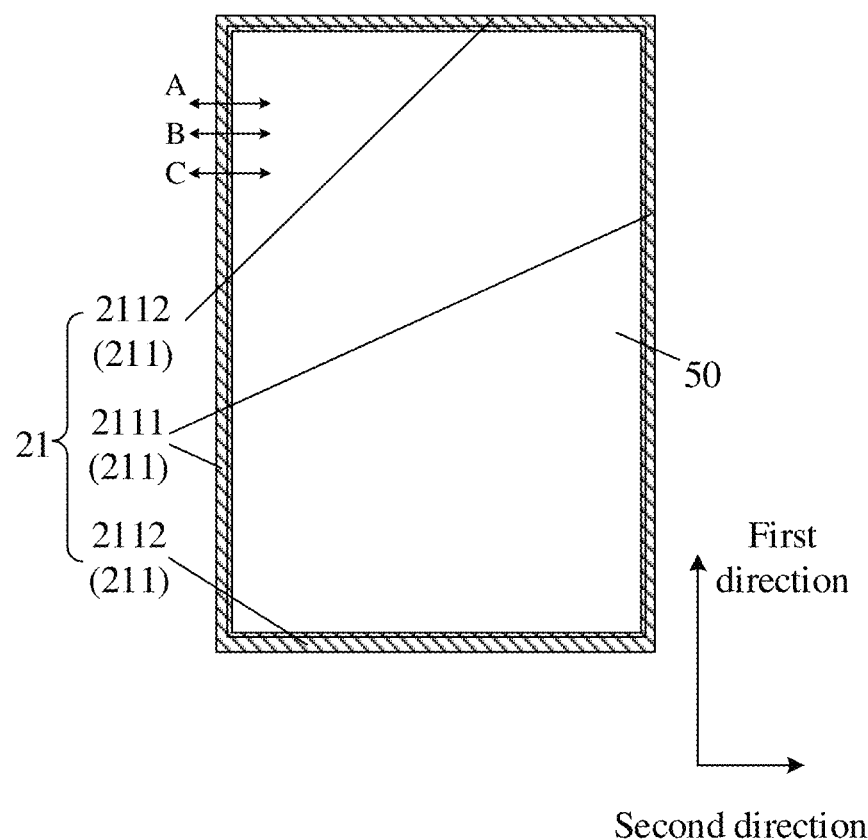
FIG. 1 is a plan view of a display module according to some embodiments of the present disclosure.
Figure 2:
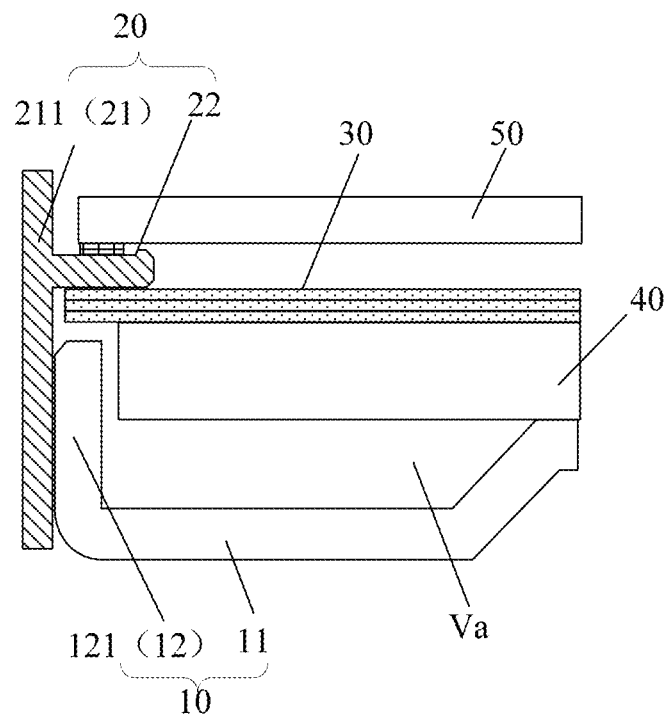
FIG. 2 is a cross-sectional view taken along a line A-A' of FIG. 1.
Figure 3:
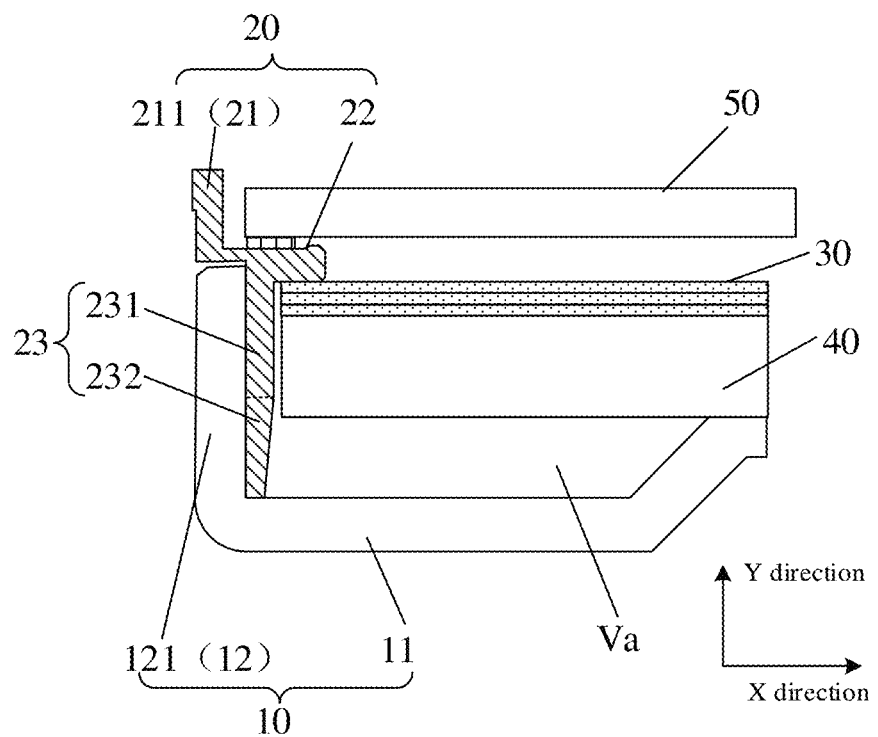
FIG. 3 is a cross-sectional view taken along a line B-B' of FIG. 1.
Figure 4:
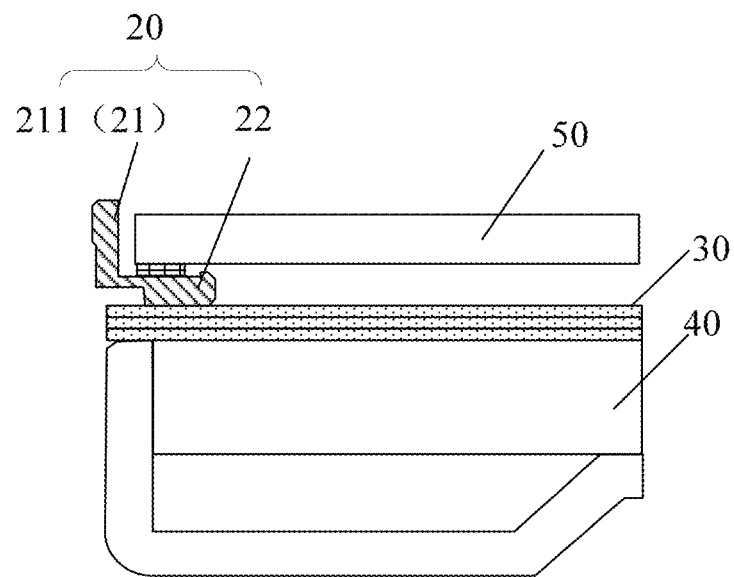
FIG. 4 is a cross-sectional view taken along a line C-C' of FIG. 1.

FIG. 1 is a plan view of a display module according to some embodiments of the present disclosure. FIG. 2 is a cross-sectional view taken along a line A-A' of FIG. 1. FIG. 3 is a cross-sectional view taken along a line B-B' of FIG. 1. FIG. 4 is a cross-sectional view taken along a line C-C' of FIG. 1. As shown in FIGS. 1 to 4, the display module includes: a display panel 50, a back plate 10 and a frame 20.

The back plate 10 includes a bottom wall 11 and a side frame 12 connected to each other to define an accommodating space Va. The side frame 12 surrounds the accommodating space Va. Optionally, the accommodating space Va has a substantially rectangular parallelepiped structure. In this case, the side frame 12 may include a plurality of back plate sidewalls 121, and different back plate sidewalls 121 are located on different sides of the accommodating space Va.

The frame 20 includes: a retaining wall 21 and a supporting platform 22 disposed on the retaining wall 21, wherein at least a portion of the retaining wall surrounds the side frame 12. The supporting platform extends toward the inside of the accommodating space Va for supporting the display panel. The frame 20 further includes an insert 23 connected to the retaining wall 21 and located on a side of the side frame 12 facing the accommodating space Va, so that the side frame 12 is embedded between the retaining wall 21 and the insert 23. The insert 23 may be directly or indirectly connected to the retaining wall 21. For example, the insert 23 is disposed on the supporting platform 22, so as to be connected to the retaining wall 21 through the supporting platform 22.

It should be noted that the description that the side frame 12 is embedded between the retaining wall 21 and the insert 23 means that the retaining wall 21 is provided on a side of the side frame 12 facing away from the accommodating space Va and the insert 23 is provided on a side of the side frame 12 facing the accommodating space Va, but does not mean that the insert 23 and the retaining wall 21 are directly opposite to each other.

When the display panel is supported on the supporting platform 22, a certain pressure is applied to the supporting platform 22, so that a force in a direction away from the accommodating space Va is applied to an end of the retaining wall 21 close to the bottom wall 11. Especially in a narrow-frame display module, a thickness of the retaining wall 21 is reduced, the strength of the retaining wall 21 is correspondingly reduced, and the retaining wall 21 is prone to tilting outwards. In the embodiment of the present disclosure, at least a portion of the retaining wall 21 of the frame 20 surrounds the side frame 12 of the back plate 10, and the insert 23 is disposed on the retaining wall 21, so that the side frame 12 is embedded between the retaining wall 21 and the insert 23. In this case, when the display panel is supported on the supporting platform 22, even if the strength of the retaining wall 21 is low, the embedded structure formed by the side frame 12, the retaining wall 21, and the insert 23 can prevent the retaining wall 21 from tilting, thereby preventing the frame 20 from deforming, and further improving the structural stability of the display module.

In some embodiments, the insert 23, the supporting platform 22 and the retaining wall 21 may be formed into a one-piece structure, so as to improve the structural stability of the frame 20 itself.

In some embodiments, the retaining wall 21 includes a plurality of retaining wall sidewalls 211 connected to each other, each retaining wall sidewall 211 is located on one side of the accommodating space Va, different retaining wall sidewalls 211 are located on different sides of the accommodating space Va, and at least a portion of each retaining wall sidewall 211 is located on a side of the side frame 12 away from the accommodating space Va. The side frame 12 includes: a plurality of back plate sidewalls 121 connected to each other, each back plate sidewall 121 is located on a side of the accommodating space Va, different back plate sidewalls 121 are located on different sides of the accommodating space Va. For example, the display module is rectangular, the retaining wall 21 includes four retaining wall sidewalls 211, and the side frame 12 includes four back plate sidewalls 121. At least one retaining wall sidewall 211 is provided with the insert 23 thereon.

Figure 5:
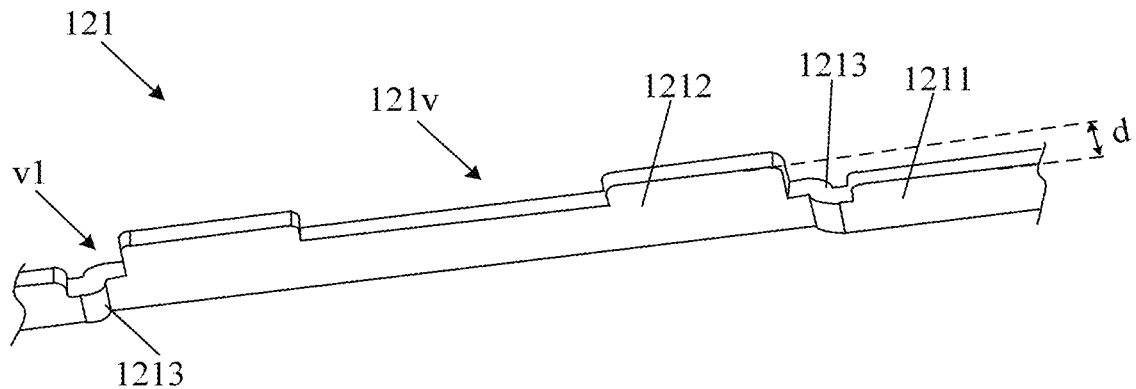
FIG. 5 is a perspective view of a part of a back plate sidewall according to some embodiments of the present disclosure.
Figure 6:
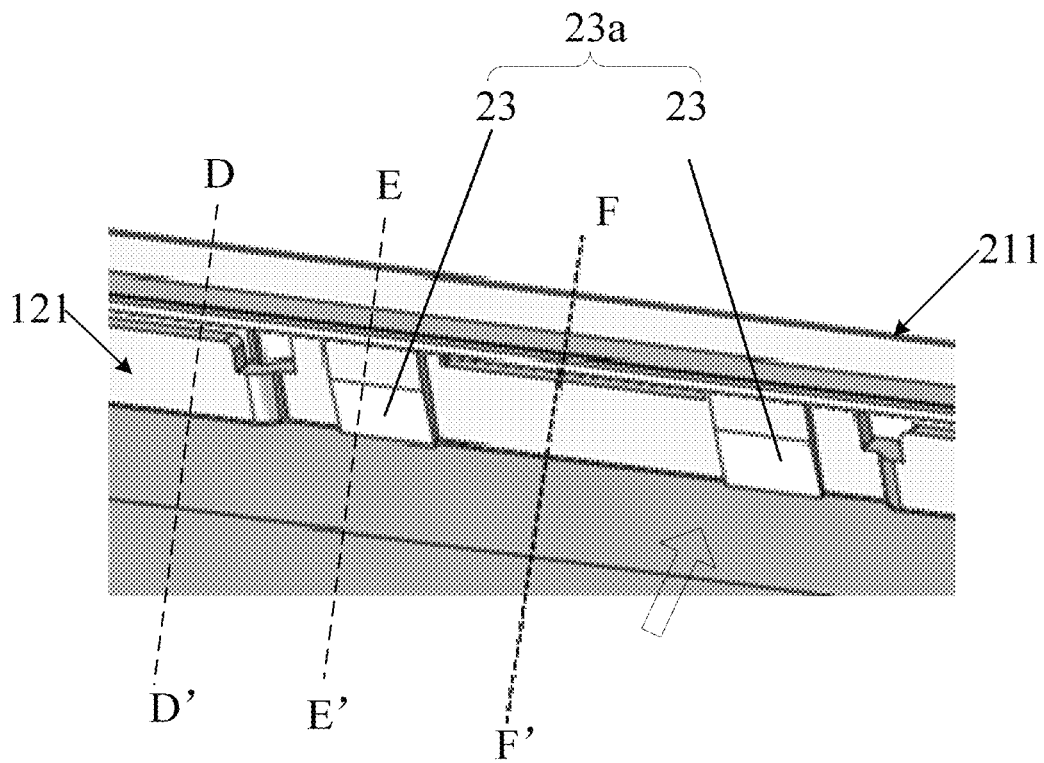
FIG. 6 is a perspective view illustrating a part of a back plate sidewall and a sidewall of a frame assembled together according to some embodiments of the present disclosure.
Figure 7:
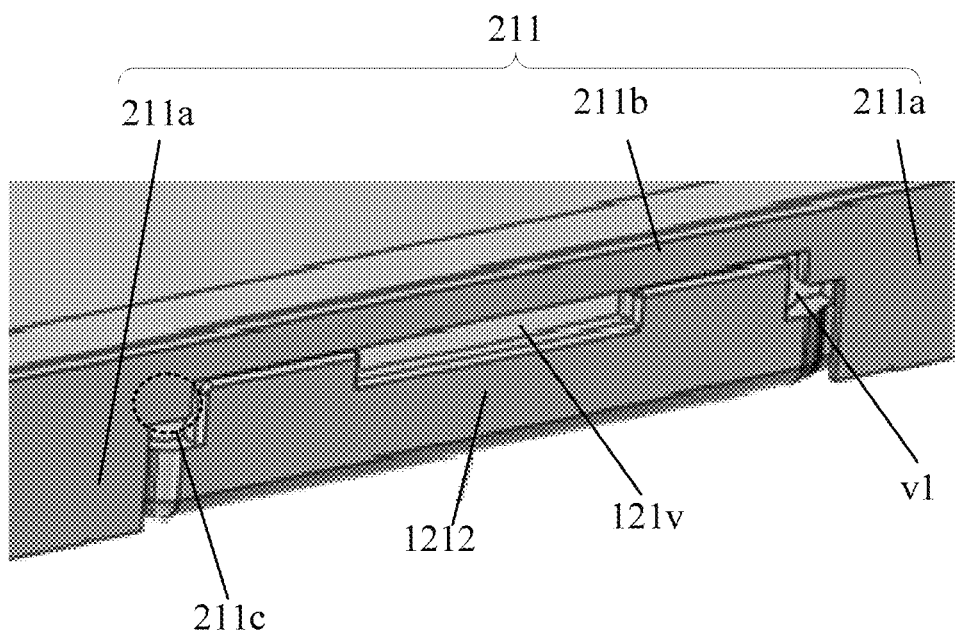
FIG. 7 is another perspective view illustrating a part of a back plate sidewall and a sidewall of a frame assembled together according to some embodiments of the present disclosure.

FIG. 5 is a perspective view of a part of a sidewall of a back plate according to some embodiments of the present disclosure. FIG. 6 is a perspective view illustrating a part of a sidewall of a back plate and a sidewall of a frame assembled together according to some embodiments of the present disclosure. FIG. 7 is another perspective view illustrating a part of a sidewall of a back plate and a sidewall of a frame assembled together according to some embodiments of the present disclosure. FIGS. 6 and 7 show partial perspective views at different angles, and it is understood that a cross-sectional view taken along a line D-D' in FIG. 6 is shown as a cross-sectional view of the frame 20 and the back plate 10 in FIG. 2, a cross-sectional view taken along a line E-E' in FIG. 6 is shown as a cross-sectional view of the frame 20 and the back plate 10 in FIG. 3, and a cross-sectional view taken along a line F-F' in FIG. 6 is shown as a cross-sectional view of the frame 20 and the back plate 10 in FIG. 3. In some embodiments of the present disclosure, referring to FIGS. 5 to 7, which showing the structure of at least one back plate sidewall 121 and at least one retaining wall sidewall 211, the at least one retaining wall sidewall 211 is provided with the insert 23, and the at least one retaining wall sidewall 211 provided with the insert 23 includes at least one notch portion opposite to the insert 23. The notch portion is formed by grooving the retaining wall sidewall 211 (forming a groove in the retaining wall sidewall 211), and may penetrate through the retaining wall sidewall 211 in a thickness direction of the retaining wall sidewall 211. Specifically, as shown in FIG. 7, each retaining wall sidewall 211 provided with the insert 23 may include a first portion 211a and a second portion 211b, which define the notch portion (i.e., the notch portion located between the two first portions 211a and occupied by a second sub-sidewall 1212 in FIG. 7), and the insert 23 is connected to the second portion 211b and is disposed opposite to the notch portion. The back plate sidewall 121 corresponding to the retaining wall sidewall 211 provided with the insert 23 adopts the structure shown in FIG. 5, and includes a first sub-sidewall 1211 and a second sub-sidewall 1212 connected to each other, where the first sub-sidewall 1211 is disposed opposite to the retaining wall sidewall 211 and located on a side of the first portion 211a of the retaining wall sidewall 211 facing the accommodating space Va, the second sub-sidewall 1212 is disposed opposite to the insert 23, and at least a portion of the second sub-sidewall 1212 is located in the notch portion, thereby reducing a frame width of the display module.

As shown in FIG. 5, a surface of the first sub-sidewall 1211 facing the accommodating space Va and a surface of the second sub-sidewall 1212 facing the accommodating space Va are respectively located in two planes, and a distance d between the two surfaces may be smaller than or equal to a thickness of the frame sidewall 121. In one example, the distance d between the two surfaces is between 0.5 mm and 1 mm, so that the frame width of the display module is reduced. For example, d is 0.5 mm, or 0.6 mm, or 0.7 mm, or 0.8 mm, or 0.9 mm or 1 mm.

In some embodiments, a surface of the second sub-sidewall 1212 away from the accommodating space Va and a surface of the retaining wall sidewall 211 away from the accommodating space Va are substantially in the same plane. It should be noted that two surfaces are "substantially" located in the same plane, which means that a distance between planes where the two surfaces are located is less than a certain value, such as less than 0.2 mm, or less than 0.15 mm, or less than 0.1 mm, or less than 0.05 mm. Alternatively, two surfaces being "substantially" in the same plane may mean that the two surfaces are entirely located in the same plane.

As shown in FIG. 5, both ends of the second sub-sidewall 1212 are connected to the first sub-sidewall 1211 through connecting sub-walls 1213, and an arc chamfer is formed between each connecting sub-wall 1213 and each of the first sub-sidewall 1211 and the second sub-sidewall 1212 connected to the connecting sub-wall 1213, so as to facilitate the fabrication of the back plate. For example, in the process of fabricating the back plate, an initial back plate having a bottom wall 11 and a flat sidewall may be fabricated, and then a portion of the flat sidewall where the second sub-sidewall 1212 is to be formed is punched outwards, so as to form the desired back plate, wherein the punched portion is the second sub-sidewall 1212, the non-punched portion is the first sub-sidewall 1211, and the portion connected between the first sub-sidewall 1211 and the second sub-sidewall 1212 is the connecting sub-wall 1213.

As shown in FIG. 5, heights of the first sub-sidewall 1211 and the second sub-sidewall 1212 are both greater than a height of the connection sub-wall 1213, so that a groove v1 is formed at each connection sub-wall 1213, which is more advantageous for punching the flat sidewall to obtain the first sub-sidewall 1211, the second sub-sidewall 1212 and the connection sub-walls 1213.

When the groove v1 is provided between the first sub-sidewall 1211 and the second sub-sidewall 1212, as shown in FIG. 7, the first portion 211a of the retaining wall sidewall 211 includes a corner 211c at the intersection of the first portion 211a and the second portion 211b and opposite to the groove v1, thereby improving the structural stability of the retaining wall sidewall 211. In addition, a certain gap may be left between the corner 211c and each of the connecting sub-wall 1213 and the second sub-sidewall 1212, so as to facilitate the assembly of the frame 20 and the back plate 10.

As shown in FIG. 1, in some embodiments, the retaining wall sidewalls 211 of the frame 20 include: a plurality of first retaining wall sidewalls 2111 extending in a first direction and a plurality of second retaining wall sidewalls 2112 extending in a second direction, the first direction intersecting the second direction. Here, first retaining wall sidewalls 2111 "extending in a first direction" means that an orthographic projection of each first retaining wall sidewall 2111 on a plane where the bottom wall 11 of the back plate is located substantially extends in the first direction, and even if there are some protrusions or depressions on the side of the first retaining wall sidewall 2111 facing the accommodating space, the overall extending tendency of the first retaining wall sidewall 2111 is not affected. Similarly, second retaining wall sidewalls 2112 "extending in a second direction" means that an orthographic projection of each second retaining wall sidewall 2112 on a plane where the bottom wall 11 of the back plate is located substantially extends in the second direction.

A length of the first retaining wall sidewall 2111 is greater than that of the second retaining wall sidewall 2112. For example, a shape of the display module may be a rectangle, and the plurality of retaining wall sidewall 211 of the frame includes two first retaining wall sidewalls 2111 and two second retaining wall sidewalls 2112, where the first direction is perpendicular to the second direction. It should be noted that the "rectangle" may be a right-angled rectangle or a rounded rectangle, in which at least one of the four vertices of the rectangle is a rounded corner.

In one example, the length of the first retaining wall sidewall 2111 is greater than the length of the second retaining wall sidewall 2112, and the insert 23 may be disposed only on the first retaining wall sidewall 2111 to satisfy the structural strength of the display module in a "portrait screen" use. In the "portrait screen" use, the second retaining wall sidewall 2112 extends in a direction parallel to a surface (e.g., a horizontal surface such as a desktop, a floor, etc.) on which the display module is placed in use.

In one particular example, the display modules are particularly suitable for use in a medical system. Further, the medical system may be a medical spliced display system in which a plurality of display modules may be spliced into a larger size display screen that may be used as a medical diagnostic display screen. For example, at least two display modules are arranged side by side and spliced together along a second direction, the second direction is a left-right direction of the display modules in use, and the first direction is a height direction of the display modules in use. That is, the first retaining wall sidewall 2111 is the retaining wall sidewalls 211 on the left side and the right side, and the second retaining wall sidewall 2112 is the retaining wall sidewalls 211 on the upper side and the lower side. In this case, the frame width of the display module on the left and right sides can be reduced, thereby reducing a width of the sliced seam between any two adjacent display modules. When the width of the frame is small, the stability of the structure can be improved by providing the insert 23 on the first retaining wall sidewall 2111 at the narrow frame. In addition, light bars and a flexible printed circuit board and the like may be provided at the position facing the second retaining wall sidewall 2112, so that the frame of the display module corresponding to the second retaining wall sidewall 2112 is wider, that is, the upper and lower frames are wider. When the widths of the upper and lower frames are greater, deformation is not easily caused by the pressure of the display panel, and thus, the insert may not be provided on the second retaining wall sidewall 2112. That is to say, in the embodiment of the present disclosure, the insert 23 may be disposed only on the first retaining wall sidewall 2111, so as to improve the structural stability of the display module and facilitate the production of the display module.

In some embodiments, each first retaining wall sidewall 2111 is provided with the insert 23 thereon, so as to improve the structural stability of the display module as much as possible. For example, as shown above, the display module is a rectangular display module. In this case, the two first retaining wall sidewalls 2111 are disposed side by side in the second direction, the two first retaining wall sidewalls 2111 are both provided with the inserts 23. In addition, the positions where the inserts 23 are disposed on the two first retaining wall sidewalls 2111 may be mirror-symmetric with respect to a reference axis extending along the first direction, so that when the display panel is supported on the supporting platform, the forces on the retaining wall sidewalls 211 on both sides of the frame 20 are more balanced, and the structural stability is further improved.

As shown in FIG. 6, in some embodiments, the inserts 23 on the frame are divided into a plurality of insert groups 23a, each insert group 23a includes at least one insert 23, and each insert group 23a is disposed opposite to the corresponding second sub-sidewall 1212. It should be noted that FIG. 6 only schematically illustrates one insert group 23a on the retaining wall sidewall 211, and it should be understood that other insert groups 23a may be disposed at other positions of the retaining wall sidewall 211; in the other retaining wall sidewall 211, the insert group 23a may also be provided.

Figure 8:
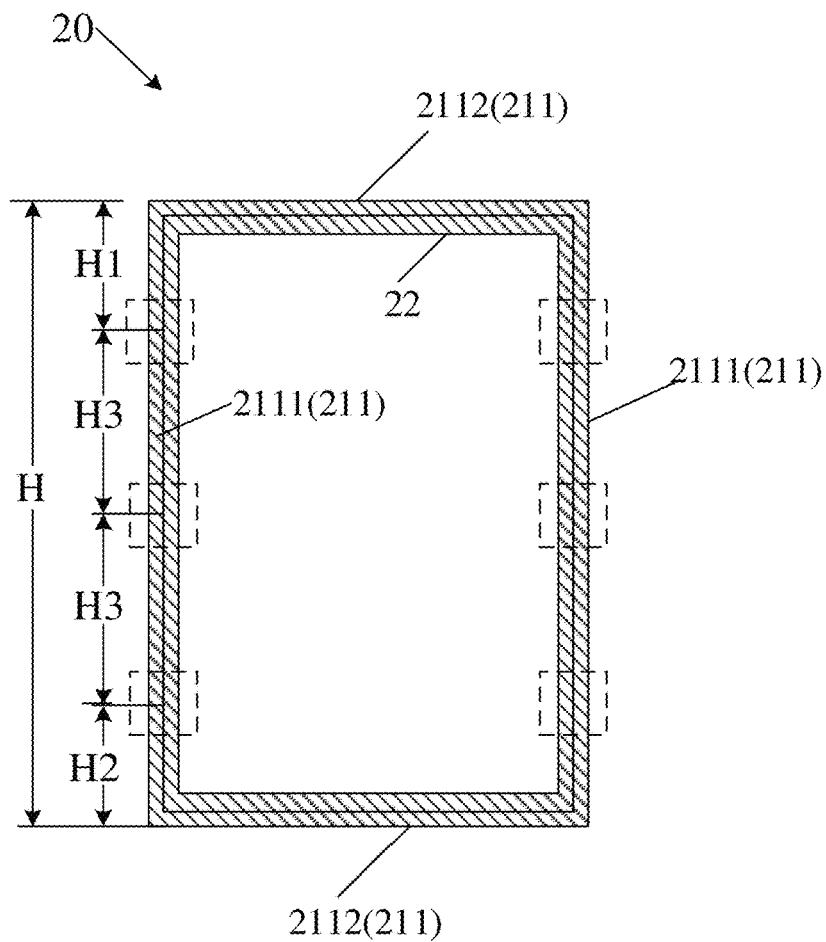
FIG. 8 is a schematic diagram illustrating a distribution position of insert groups in a frame according to some embodiments of the present disclosure.

For example, FIG. 8 is a schematic diagram illustrating a distribution position of insert groups in a frame according to some embodiments of the present disclosure. A dashed box in FIG. 8 indicates a position of the insert group 23a, and as shown in FIG. 8, a plurality of insert groups 23a are disposed on each first retaining wall sidewall 2111.

In one embodiment, the plurality of insert groups 23a on each first retaining wall sidewall 2111 are uniformly distributed, so that the force applied to the first retaining wall sidewall 2111 is more uniform. It should be noted that the plurality of insert groups 23a on each first retaining wall sidewall 2111 are uniformly distributed, which means that distances between adjacent insert groups 23a on each first retaining wall sidewall 2111 are equal or substantially equal to each other.

In one example, the first retaining wall sidewall 2111 has a length H, and a center-to-center distance H3 between any two adjacent insert groups 23a on each first retaining wall sidewall 2111 is in a range from ⅕ to ½ times of H; preferably, a distance H1 from one end of the first retaining wall sidewall 2111 to a center of an insert group 23a and a distance H2 from the other end of the first retaining wall sidewall 2111 to the center of the insert group 23a are both in a range from 1/10 to ⅙ times of H. In this case, when the first retaining wall sidewall 2111 is long, H1, H2 and H3 may be set to be larger values without increasing the number of the insert groups 23a, so that the force on the first retaining wall sidewall 211 is more uniform, and the production and manufacturing of the frame 20 are facilitated.

For example, H1 and H2 are both 1/10, ⅙, ⅕, ¼ times of H.

For example, H3 is ⅕, ¼, ⅓, ½ times of H.

For example, three insert groups 23a are provided on each first retaining wall sidewall 2111, and on each first retaining wall sidewall 2111, the distance H1 from one end of the first retaining wall sidewall 2111 to the center of the insert group 23a and the distance H2 from the other end of the first retaining wall sidewall 2111 to the center of the insert group 23a are both ⅙ times of H, and the center-to-center distance between any two adjacent insert groups 23a is ⅓ times of H.

In another example, the plurality of insert groups 23a are provided on each first retaining wall sidewall 2111, the number of insert groups 23a on each first retaining wall sidewall 2111 may be determined based on the actual length of the first retaining wall sidewall 2111. The larger the length of the first retaining wall sidewall 2111 is, the larger the number of insert groups 23a is; the smaller the length of the first retaining wall sidewall 2111 is, the smaller the number of insert groups 23a is. On each first retaining wall sidewall 2111, the center-to-center distance H3 between any two adjacent insert groups 23a is less than or equal to 150 mm; preferably, the distance H1 from one end of the first retaining wall sidewall 2111 to the center of the insert group 23a and the distance H2 from the other end of the first retaining wall sidewall 2111 to the center of the insert group 23a are both less than or equal to 100 mm. In this way, the frame 20 can be prevented from being deformed by the pressure from the display panel. Further, when H1, H2 and H3 are too small, the number of the insert groups 23a is large, which is not beneficial to production and manufacturing. Thus, for example, H1 and H2 may be between 70 mm and 80 mm, and H3 may be between 120 mm and 130 mm, so as to prevent the frame 20 from deforming, and to facilitate the production and manufacturing of the frame 20.

In still another example, the plurality of insert groups 23a are provided on each first retaining wall sidewall 2111. On one hand, the center-to-center distance H3 between any two adjacent insert groups 23a is set to be in a range from 1/5 to 1/2 times of H. In this case, when the first retaining wall sidewall 2111 is longer, the number of insert groups 23a is not too large, so that the production and manufacturing of the frame 20 are facilitated; on the other hand, the distance H1 from one end of the first retaining wall sidewall 2111 to the center of the insert group 23a and the distance H2 from the other end of the first retaining wall sidewall 2111 to the center of the insert group 23a are both less than or equal to 100 mm. In this case, when the first retaining wall sidewall 2111 is longer, the two ends of the first retaining wall sidewall 2111 are prevented from being deformed under the pressure from the display panel, and the overall stability of the frame 20 is improved.

Figure 9:
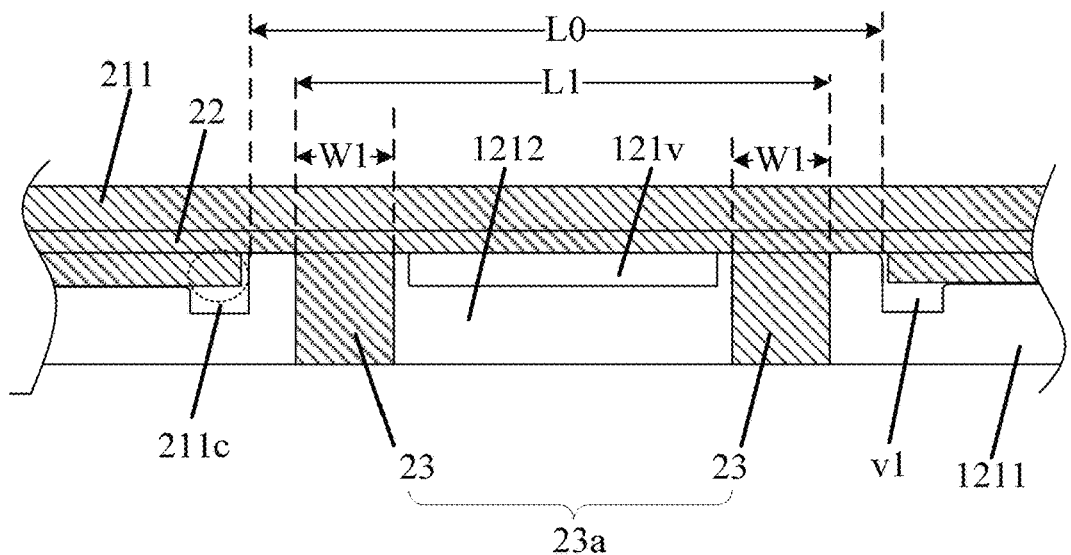
FIG. 9 is a plan view illustrating a part of a back plate sidewall and a sidewall of a frame assembled together according to some embodiments of the present disclosure.

FIG. 9 is a plan view illustrating a part of a sidewall of a back plate and a sidewall of a frame assembled together according to some embodiments of the present disclosure. The view shown in FIG. 9 is an effect view viewed along a direction shown by an arrow in FIG. 6. As shown in FIGS. 6 and 9, each insert group 23a includes at least two inserts 23 arranged at intervals. For example, each insert group 23a includes two inserts 23. In some embodiments, each insert 23 may have a thickness less than that of the first retaining wall sidewall 2111, thereby achieving the narrow frame and improving the product reliability. For example, the thickness of the first retaining wall sidewall 2111 is 0.6 mm, the thickness of each insert is 0.4 mm. It should be noted that the thickness of the insert 23 is the largest size of the insert 23 in the thickness direction of the first retaining wall sidewall 2111.

It should be noted that thicknesses of different portions of each insert 23 may not be exactly the same. In some embodiments, each insert 23 includes a first insert portion 231 and a second insert portion 232 extending toward the bottom wall 11, the first insert portion 231 may be connected to the supporting platform 22, and the second insert portion 232 is located on a side of the first insert portion 231 facing the bottom wall 11. For example, thicknesses of different portions of the first insert portion 231 may be the same. A thickness of the second insert portion 232 satisfies: the thickness of the second insert portion 232 gradually becomes smaller in a direction from a portion of the second insert portion 232 away from the bottom wall to a portion of the second insert portion 232 close to the bottom wall. In this way, the insert 23 is easily formed and the second insert portion 232 can have a certain flexibility, so that when a light guide plate or other members in the accommodating space expand to press the second insert portion 232, the second insert portion 232 can provide a certain expansion space for the light guide plate in the accommodating space.

A surface of the second insert portion 232 facing the accommodating space Va may be an inclined surface, and a surface of the first insert portion 231 away from the accommodating space Va and a surface of the second insert portion 232 away from the accommodating space may be in the same plane. For example, the surface of the first insert portion 231 away from the accommodating space Va and the surface of the second insert portion 232 away from the accommodating space are both attached to the back plate sidewall 121, so that the one-piece structure formed by the frame 20 and the back plate 10 is more stable.

Illustratively, a thickness of an end of the second insert portion 232 facing the bottom wall 11 is greater than or equal to half of the thickness of the first insert portion 231.

In some embodiments, a height of the second insert portion 232 is in a range from 1/3 to 1/2 of a height of the insert 23, so as to ensure that the insert 23 can provide a certain supporting force for the side frame 121 of the back plate 10, facilitate the forming of the insert 23, and provide a certain expansion space when the light guide plate or other members expand. For example, the height of the second insert portion 232 is 1/3 or 5/12 or 1/2 of the height of the insert 23.

It should be noted that the thickness of the first insert portion 231/the second insert portion 232 refers to a size of the first insert portion 231/the second insert portion 232 in a thickness direction of the first retaining wall sidewall 2111 (i.e., the X direction in FIG. 3). The height of the first insert portion 231/the second insert portion 232 refers to a size of the first insert portion 231/the second insert portion 232 in a thickness direction of the bottom wall 11 (i.e., the Y direction in FIG. 3).

In addition, in the embodiments of the present disclosure, a shape of an orthographic projection of the insert 23 on the second sub-sidewall 1212 is not limited, and may be a rectangle, a trapezoid, or the like.

In one example, the insert 23 may extend into contact with the bottom wall 11. When the size of the insert 23 in the first direction is small and the distance between two adjacent inserts 23 in the same insert group 23a is too small, the overall strength of the insert group 23a is small, which results in a low stability of the one-piece structure formed by the back plate 10 and the frame 20, and the frame 20 may still deform under the pressure of the display panel 10. In order to improve the stability of the one-piece structure, in some embodiments, the size W1 of each insert 23 in the first direction is between 5 mm and 10 mm, for example, the size W1 is 5 mm, or 6 mm, or 7 mm, or 8 mm, or 9 mm or 10 mm. In the same insert group 23a, a farthest distance L1 between the two inserts 23 farthest from each other is greater than or equal to 24 mm, so as to prevent the frame 20 from deforming under the pressure of the display panel as much as possible. In addition, a light shielding tape (to be described later in detail) may be attached at a position corresponding to the second sub-sidewall 1212, and when L1 is too large, an area of the light shielding tape may be increased accordingly, thereby affecting the appearance. Optionally, the L1 is between 24 mm and 50 mm, for example, L1 is 24 mm, or 30 mm, or 35 mm, or 40 mm, or 45 mm or 50 mm. It should be noted that the farthest distance L1 between the two inserts 23 is a distance between two sides of the two inserts 23 that are farthest from each other. Optionally, a length L0 of the second sub-sidewall 1212 corresponding to the insert group 23a is greater than the length L1, for example, L0 is between 30 mm and 60 mm, for example, L0 is 30 mm or 40 mm or 50 mm or 60 mm. The length L0 of the second sub-sidewall 1212 is a size of the second sub-sidewall 1212 in the first direction.

Figure 10:
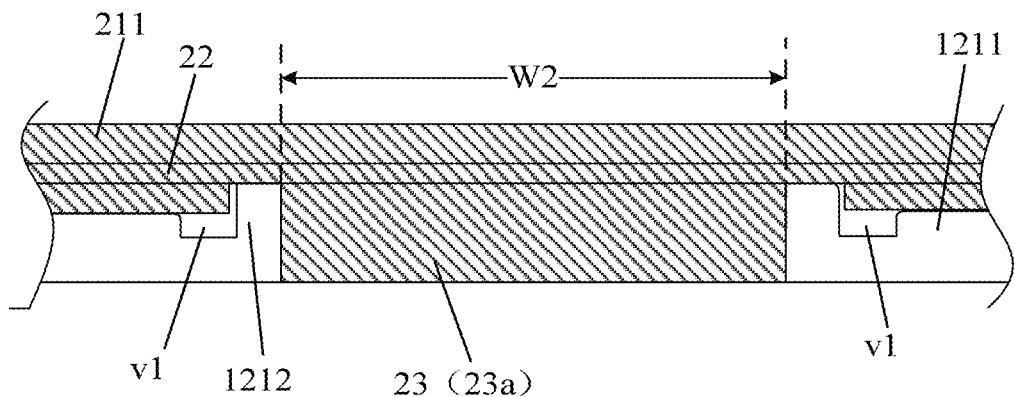
FIG. 10 is a plan view illustrating a part of a back plate sidewall and a sidewall of a frame assembled together according to some embodiments of the present disclosure.

It should be noted that in the above embodiment, each insert group 23a includes the plurality of inserts 23 as an example. Alternatively, in other embodiments, the plurality of inserts 23 in the same insert group 23a shown in FIG. 9 may be connected together so that the plurality of inserts 23 have a one-piece structure, that is, one insert 23 is included in each insert group 23a, as shown in FIG. 10. In FIG. 10, a size W2 of the insert 23 in the first direction is between 20 mm and 50 mm.

In some embodiments, as shown in FIGS. 5, 7 and 9, a slot 121v is provided at an end of the second sub-sidewall 1212 away from the bottom wall 11, and is used for limiting the position of the optical film, which will be described below.

With continued reference to FIGS. 2 to 4, in some embodiments, the display module further includes an optical film 30, and the optical film 30 can, for example, have a light-homogenizing function. For example, the display module includes a plurality of optical films 30, including: a diffuser, a prism, and the like. Alternatively, the display module may further include a light guide plate 40 and a light bar (not shown), wherein the light guide plate 40 is located between the optical films 30 and the bottom wall 11 of the back plate, and includes an out-light surface facing the optical films 30, a bottom surface opposite to the out-light surface, and an in-light surface connected between the out-light surface and the bottom surface. The bottom wall 11 of the back plate 10 has a protruding portion 11*a* protruding toward the optical films 30, and the light guide plate 40 may be supported on the protruding portion 11*a*. The light bar is opposite to the in-light surface of the light guide plate 40. The light bar may be disposed between the light guide plate 40 and one of the second retaining wall sidewalls 212 of the frame, so that light from the light bar enters the light guide plate 40 from one side of the light guide plate 40; light bars may also be disposed between the light guide plate 40 and the two second retaining wall sidewalls 2112 of the frame, so that light from the light bars may enter the light guide plate 40 from two sides.

Figure 11:
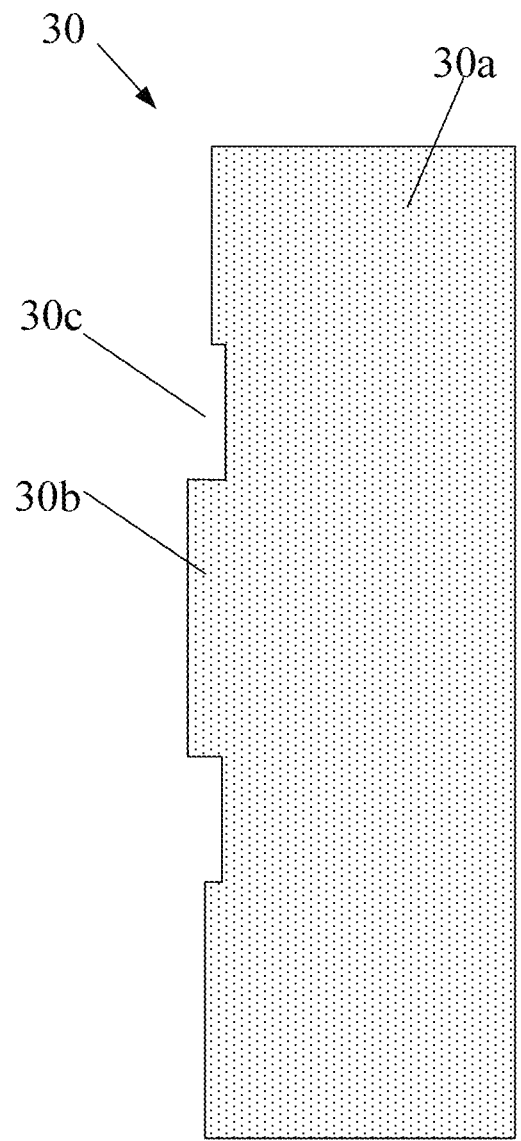
FIG. 11 is a plan view of a part of an optical film according to some embodiments of the present disclosure.
Figure 12:
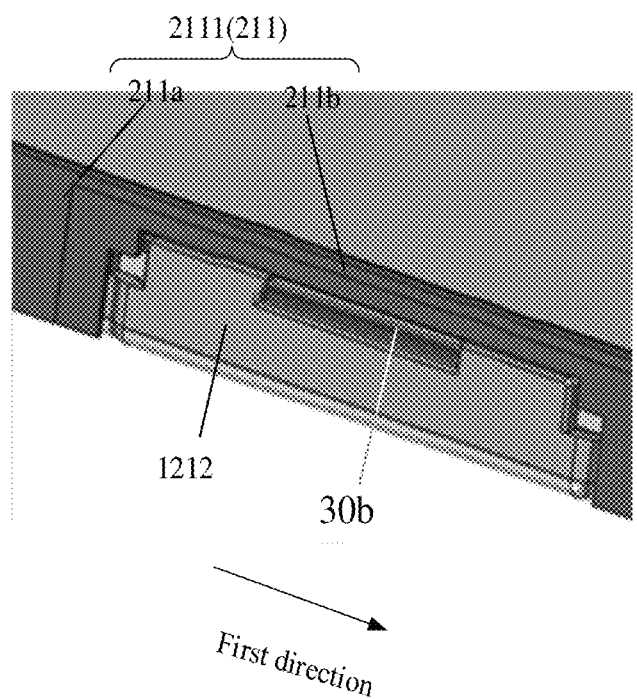
FIG. 12 is a schematic diagram of an optical film and a back plate sidewall mating with each other according to some embodiments of the present disclosure.

FIG. 11 is a plan view of a part of an optical film according to some embodiments of the present disclosure. FIG. 12 is a schematic diagram of an optical film and a sidewall of a back plate mating with each other according to some embodiments of the present disclosure. As shown in FIGS. 11 and 12, each optical film 30 includes: a main part 30*a*, and an avoidance notch 30*c* and a lug 30*b* which are arranged on the main part 30*a*, wherein the main part 30*a* is arranged in the accommodating space Va, the avoidance notch 30*c* is used for avoiding the insert 23, and a part of the insert 23 is positioned in the avoidance notch 30*c*; the lug 30*b* is used to engage with the back plate sidewall 121. Specifically, as shown in FIG. 7 and FIG. 11 to FIG. 12, the slot 121*v* is provided at one end of the second sub-sidewall 1212 away from the bottom wall 11, and the lug 30*b* is inserted into the slot 121*v*, so that the slot 121*v* can limit the optical films 30 in the first direction and in the thickness direction of the second sub-sidewall 1212.

The insert 121*v* may be a hole extending through the second sub-sidewall 1212. In order to facilitate the manufacturing of the insert 121*v*, in an example of the present disclosure, the insert 121*v* may be open to a side away from the bottom wall 11, that is, an opening is formed at an end of the insert 121*v* away from the bottom wall 11; as described above, the first portion 211*a* and the second portion 211*b* of the retaining wall sidewall 211 define the notch portion, and at least a portion of the second sub-sidewall 1212 extends into the notch portion, so that when the lug 30*b* is inserted into the slot 121*v*, the second portion 211*b* of the retaining wall sidewall 211 is located on a side of the lug 30*b* away from the bottom wall of the back plate, and, the second portion 211*b* of the retaining wall sidewall 211 mates with the slot 121*v*, so as to limit the optical films 30 in the thickness direction thereof.

A size of the slot 121*v* in the first direction may be slightly larger than a size of the lug 30*b* in the first direction, and a size of the slot 121*v* in a thickness direction of the optical films 30 is slightly larger than a total thickness of the lugs 30*b* of the optical films 30, so as to ensure that the lug 30*b* can be inserted into the slot 121*v*.

In addition, a depth by which the lug 30*b* is inserted into the slot 121*v* is greater than or equal to half the thickness of the second sub-sidewall 1212, so as to prevent the lug 30*b* from coming out of the slot 121*v*. Optionally, the depth by which the lug 30*b* is inserted into the slot 121*v* is 0.5 times, or 0.8 times, or 1 times of the thickness of the second sub-sidewall 1212. It should be noted that the depth by which the lug 30*b* is inserted into the slot 121*v* is a size, in the thickness direction of the second sub-sidewall 1212, of the portion of the lug 30*b* which is inserted into the slot 121*v*.

Positions of the slots 121*v* and the inserts 23 are as shown in FIG. 9, when the insert group 23*a* includes two inserts 23, each insert 23 may be located between the two slots 121*v*; when the insert group 23*a* includes a larger number of inserts 23, one slot 121*v* may be provided between every two adjacent inserts 23, thereby improving the effect of limiting the optical films 30.

In some embodiments, the bottom wall 11 of the back plate 10 and the back plate sidewall 121 may have a one-piece structure, which may be made of a material with high thermal conductivity, so as to improve the heat dissipation effect of the display module. For example, the thermal conductivity of the back plate 10 is greater than or equal to 138 W/m/° C.

Figure 13:
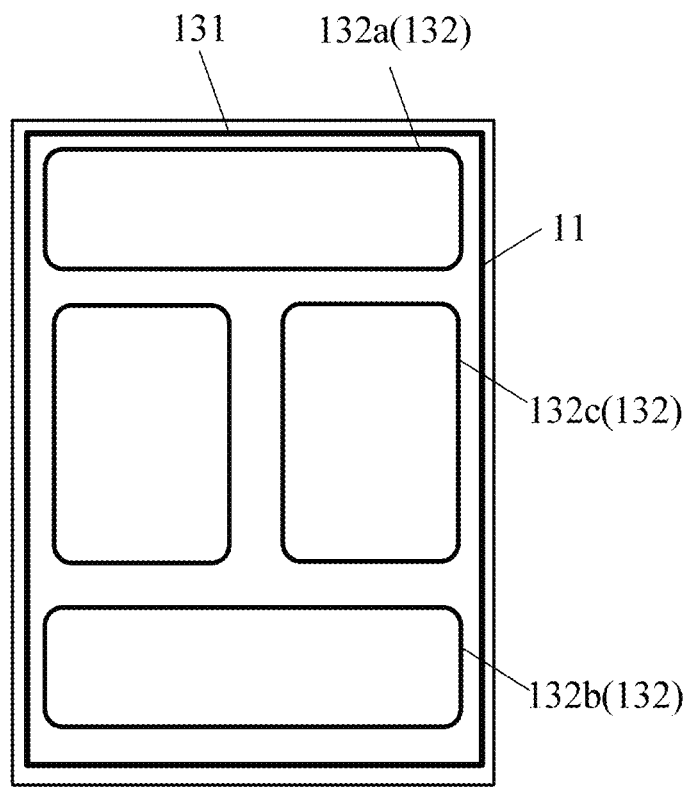
FIG. 13 is a bottom view of a back plate according to some embodiments of the present disclosure.

FIG. 13 is a bottom view of a back plate according to some embodiments of the present disclosure. As shown in FIG. 13, a plurality of reinforcing ribs are provided on a surface of the bottom wall 11 of the back plate away from the accommodating space Va, and include a first reinforcing rib 131 and a plurality of second reinforcing ribs 132 which do not overlap with each other, as shown in FIG. 13, so as to improve the strength of the back plate 10.

In the present disclosure, the display module may be a vertical display module, and the first direction is a height direction of the display module in use; and a height of each display module is greater than a width of the display module. In this case, the back plate 10 needs to have a high enough strength to ensure the structural stability of the entire display module. In addition, as described above, the display module is particularly suitable for a medical spliced display system. The medical system has a high requirement for the image quality of the display image, so that the back plate 10 needs to be ensured to have a high enough strength to stably support the display panel 50, thereby ensuring the display image quality.

To further increase the strength of the back plate 10, as shown in FIG. 13, the first reinforcing rib 131 has a first annular boundary, and the second reinforcing ribs 132 have second annular boundaries, each of which is located within the area surrounded by the first annular boundary. Optionally, the first annular boundary of the first reinforcing rib 131 is arranged at the edge of the bottom wall 11, so as to improve the overall strength of the bottom wall 11; the second annular boundary of each second reinforcing rib 132 may also be annular, and specifically, may be a rectangular ring, an oval ring, or an irregular ring.

Both the first reinforcing rib 131 and the second reinforcing ribs 132 may be formed by punching the bottom wall 11. For example, a part of the bottom wall 11 is punched in a direction away from the display panel 50 to form the second reinforcing ribs 132; a part of the bottom wall 11 is punched in a direction facing the display panel 50, thereby forming the first reinforcing rib 131.

In some embodiments, as shown in FIG. 13, the plurality of second reinforcing ribs 132 may include: a second top reinforcing rib 132*a*, a second bottom reinforcing rib 132*b*, and a plurality of second middle reinforcing ribs 132*c*, the second top reinforcing rib 132a and the second bottom reinforcing rib 132b are respectively located on both sides of the plurality of second middle reinforcing ribs 132c along the height direction of the display module, that is, the second top reinforcing rib 132a is located above the plurality of second middle reinforcing ribs 132c, the second bottom reinforcing rib 132b is located below the plurality of second middle reinforcing ribs 132c, and the plurality of second middle reinforcing ribs 132c are disposed along a width direction of the display module. Thus, when left and right ends (referring to the left and right ends in the drawing) of the back plate 10 are subjected to a force in a direction perpendicular to the paper in FIG. 13, the back plate 10 is not easily deformed by the reinforcing effect of the second middle reinforcing ribs 132c; similarly, when upper and lower ends (referring to the upper and lower ends in the drawing) of the back plate 10 are subjected to a force in a direction perpendicular to the paper in FIG. 13, the back plate is not easily deformed by the reinforcing effect of the second top reinforcing rib 132a and the second bottom reinforcing rib 132b. Therefore, the strength of the back plate 10 can be improved by providing the second reinforcing ribs 132.

In one example, the second top reinforcing rib 132a and the second bottom reinforcing rib 132b may be symmetrical or substantially symmetrical with each other. The plurality of middle reinforcing ribs 132c are mirror-symmetrical with each other about a symmetry axis extending in the height direction of the display module. For example, two second middle reinforcing ribs 132c are included, and are symmetrically disposed.

In another embodiment, the plurality of second reinforcing ribs 132 may include: a first left reinforcing rib, a second right reinforcing rib and a plurality of second middle reinforcing ribs, wherein the first left reinforcing rib and the second right reinforcing rib are respectively positioned on the left side and the right side of the plurality of second middle reinforcing ribs, and the plurality of second middle reinforcing ribs are arranged along the height direction of the display module.

Figure 14:
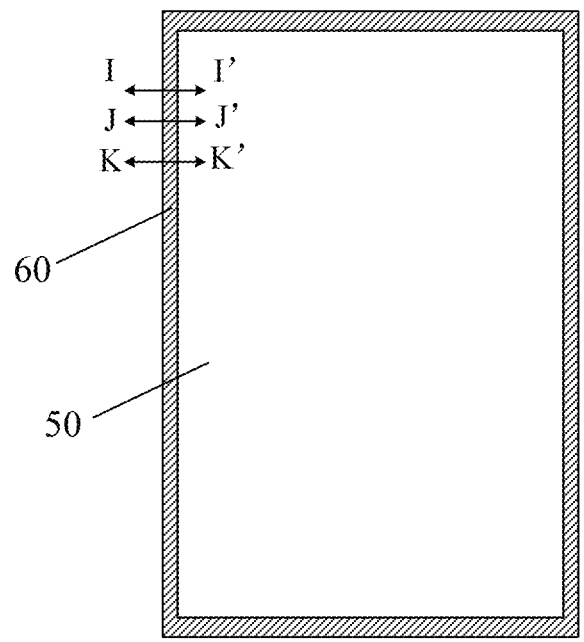
FIG. 14 is a plan view of a display module provided in further embodiments of the present disclosure.
Figure 15:
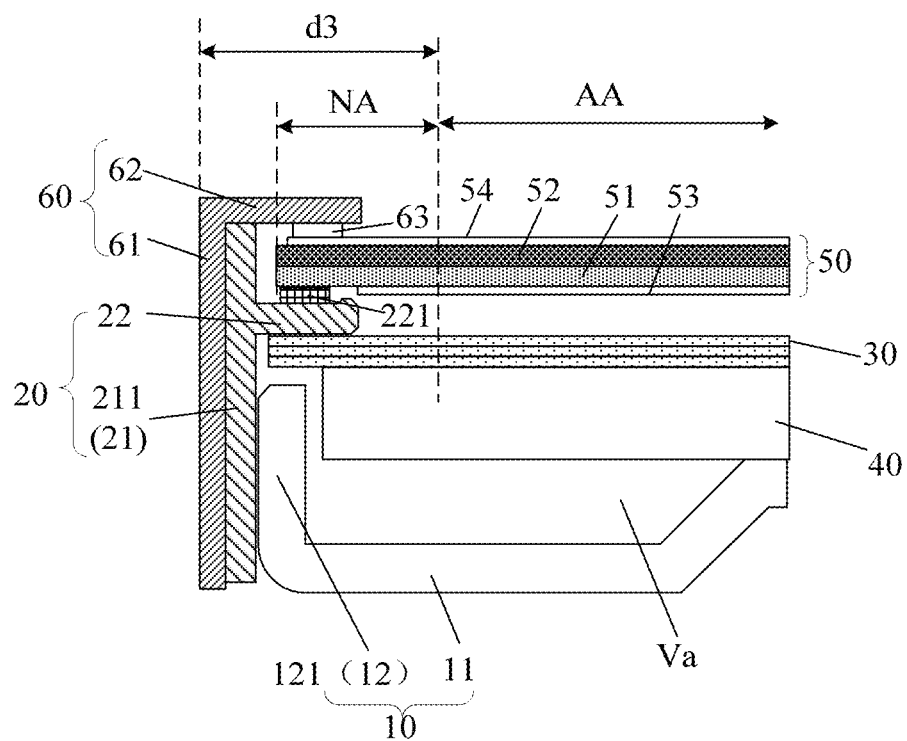
FIG. 15 is a cross-sectional view taken along a line I-I' of FIG. 14.
Figure 16:
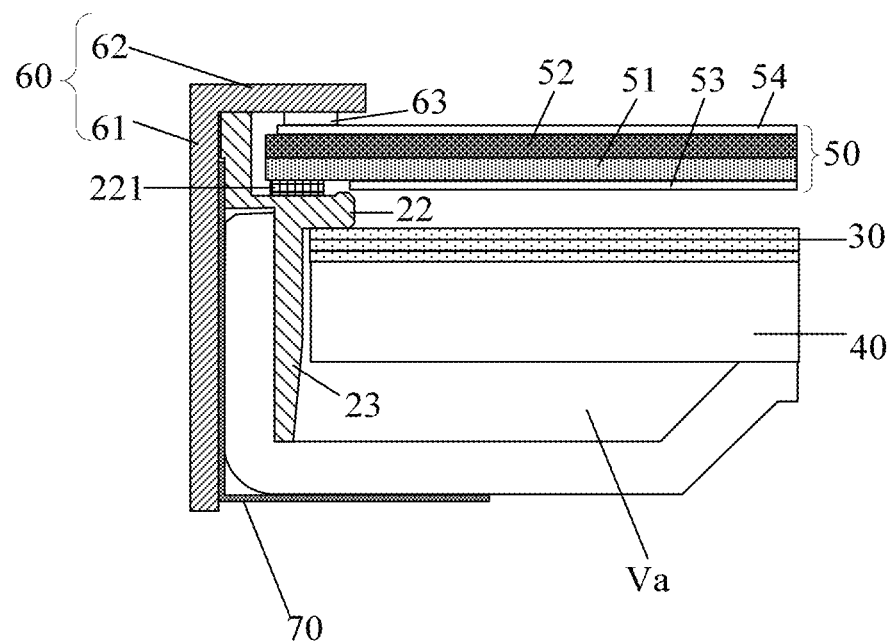
FIG. 16 is a cross-sectional view taken along a line J-J' of FIG. 14.
Figure 17:
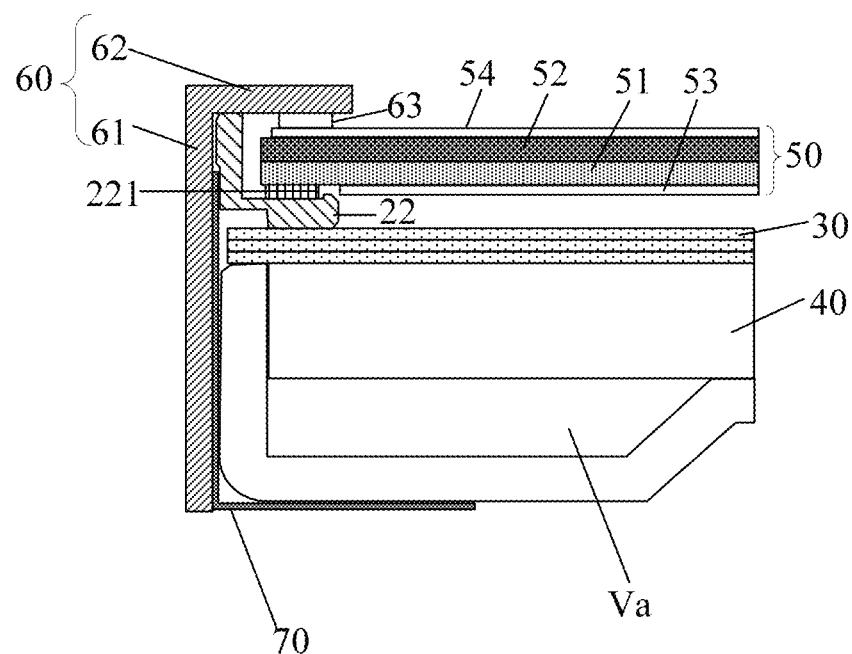
FIG. 17 is a cross-sectional view taken along a line K-K' of FIG. 14.

FIG. 14 is a plan view of a display module provided in further embodiments of the present disclosure. FIG. 15 is a cross-sectional view taken along a line I-I' of FIG. 14. FIG. 16 is a cross-sectional view taken along a line J-J' of FIG. 14. FIG. 17 is a cross-sectional view taken along a line K-K' of FIG. 14. The line I-I' corresponds to the line A-A' of FIG. 1, the line J-J' corresponds to the line B-B' of FIG. 1, and the line K-K' corresponds to the line C-C' of FIG. 1. As shown in FIGS. 14 to 17, the display panel 50 is supported on the supporting platform 22 of the frame. Optionally, an adhesive layer 221 is disposed on the supporting platform 22, and the display panel 50 is adhered to the supporting platform 22 through the adhesive layer 221. For example, the adhesive layer 211 may be a foam pad to provide a cushioning force to the display panel 50 while performing an adhesive function.

The display panel 50 includes an array substrate 51 and an opposite substrate 52 which are oppositely disposed, and a liquid crystal layer located therebetween. The array substrate 51 is located on a side of the opposite substrate 52 close to the optical film 30, and includes a substrate and devices such as a thin film transistor and a pixel electrode disposed on the substrate, and the substrate is, for example, a glass substrate. In addition, the display panel 50 further includes a first polarizer 53 and a second polarizer 54, the first polarizer is located on a side of the array substrate 51 away from the opposite substrate 52, and the second polarizer 54 is located on a side of the opposite substrate 52 away from the array substrate 51. An orthographic projection of the first polarizer 53 on the bottom wall 11 of the back plate can be located outside an orthographic projection of the supporting platform 22 on the bottom wall 11, so that the overall thickness of the display module is reduced.

The display panel 50 has a display area AA and a peripheral area NA located around the display area AA, wherein the display area AA is an area of the display panel 50 for displaying an image, an orthographic projection of the display area AA on the bottom wall 11 is located outside the orthographic projection of the supporting platform 22 on the bottom wall 11, and an orthographic projection of the peripheral area NA on the bottom wall 11 overlaps with the orthographic projection of the supporting platform 22 on the bottom wall 11.

In addition, as shown in FIGS. 14 to 17, the display module may further include a front frame 60, including a plurality of front frame sidewalls 61, and a shielding part 62 connected to the plurality of front frame sidewalls 61; a plurality of front frame sidewalls 61 surround the frame; the shielding part 62 is located on a side of the display panel 50 away from the bottom wall 11, an orthographic projection of the shielding part 62 on the display panel 50 is located in the peripheral area NA of the display panel 50, thereby shielding at least a portion of the peripheral area NA of the display panel 50. The retaining wall sidewalls 211 are in a one-to-one correspondence with the front frame sidewalls 61. The retaining wall sidewall 211 and the front frame sidewall 61 corresponding to each other are located on the same side of the accommodating space Va.

A distance between a boundary of the display area AA and an outer boundary of the shielding part 62 is the frame width of the display module. In some embodiments, the frame on at least two sides of the display module is a narrow frame with a width between 4.8 mm and 5.6 mm, and the inserts 23 are provided on the sides where the narrow frame is located. In this way, the stability of the overall structure of the display module is ensured while realizing the narrow frame. That is, a third distance d3 exists between the outer boundary of each of the shielding parts 62 corresponding to the retaining wall sidewalls 211 provided with the inserts 23 and the boundary of the display area AA, and the third distance d3 is between 4.8 mm and 5.6 mm, for example, the third distance d3 is 4.8 mm, or 5.0 mm, or 5.2 mm, or 5.4 mm or 5.6 mm.

Figure 18:
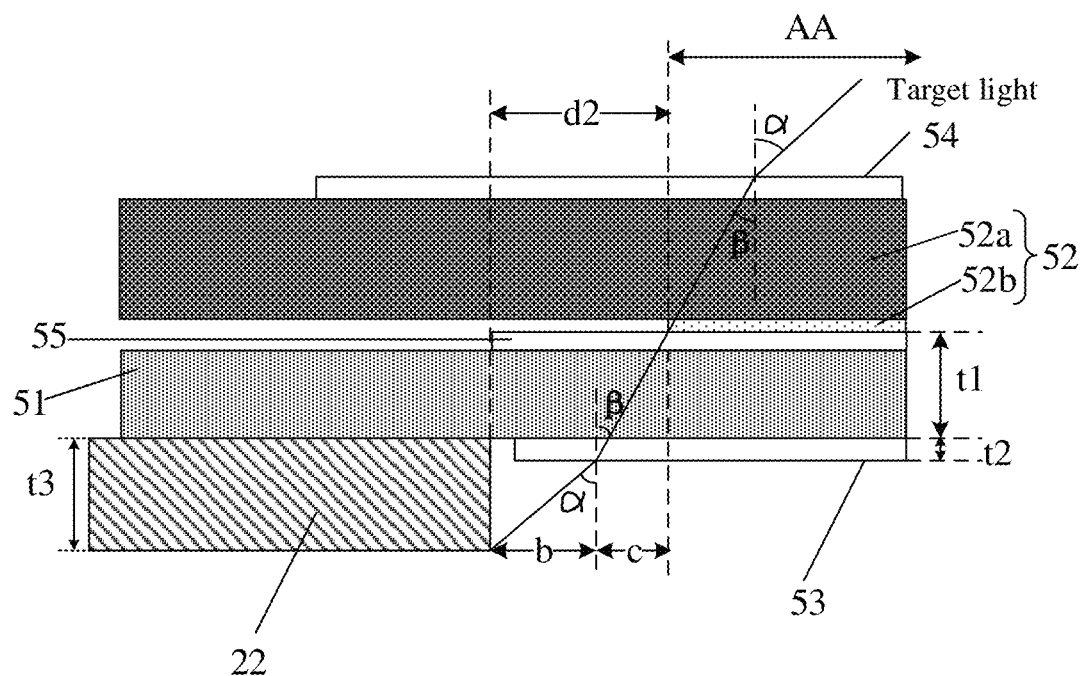
FIG. 18 is a schematic diagram illustrating light outgoing from a boundary of a display area of a display panel according to some embodiments of the present disclosure.

FIG. 18 is a schematic diagram illustrating light outgoing from a boundary of a display area of a display panel according to some embodiments of the present disclosure. As shown in FIG. 18, the supporting platform 22 has a first edge (i.e., an inner edge of the supporting platform 22) away from the retaining wall, and an orthographic projection of the first edge on the bottom wall 11 surrounds the orthographic projection of the display area AA on the bottom wall 11. The opposite substrate 52 includes a substrate 52a and a color filter layer 52b disposed on the substrate 52a and on a side of the substrate 52a facing the liquid crystal layer 55, and the display area AA may be regarded as an area where the color filter layer 52b is located. There is a second distance d2 between the orthographic projection of the first edge on the bottom wall 11 and the orthographic projection of the display area AA on the bottom wall 11. When a refractive index of the entire array substrate 51 and a refractive index of the liquid crystal layer 55 are both considered to be the same as that of the substrate of the array substrate 51, the second distance d2 corresponding to at least one side of the accommodating space Va is determined according to the following formula (1):

$$d2 \geq (t3-t2)*\tan\alpha + (t1+t2)*\tan\left(\arcsin\left(\frac{\sin\alpha}{n}\right)\right) + T \quad (1)$$

Where α is the maximum visual angle on at least one side of the display module; t1 is a sum of thicknesses of the array substrate 51 and the liquid crystal layer 55; t2 is a thickness of the first polarizer 53; t3 is a thickness of the supporting platform 22; n is the refractive index of the substrate of the array substrate 51; α is a target viewing angle; R is a refraction angle of the light incident to the display panel 50 at the target viewing angle within the display panel 50; T is an accumulated tolerance of the display module during production, and T≥0.33. For example, $\sqrt{T=T_1^2+T_2^2+T_3^2+T_4^2}$. $T_1$ is a dimensional tolerance of the frame 20; $T_2$ is an assembly tolerance of the frame 20; $T_3$ is a cutting tolerance of the display panel 50; $T_4$ is an assembly tolerance of the display panel 50. In some examples, $T_1$ is between 0.2 mm and 0.3 mm, $T_2$ is between 0.1 mm and 0.2 mm, $T_3$ is between 0.2 mm and 0.3 mm, $T_4$ is between 0.15 mm and 0.2 mm, and T is between 0.33 mm and 0.65 mm.

In a critical state, the target light just irradiates the boundary of the color filter layer 52b, d2 reaches a critical value, which is $$b + c = (t3-t2)*\tan\alpha + (t1+t2)*\tan\left(\arcsin\left(\frac{\sin\alpha}{n}\right)\right) + T,$$

where b represents: a lateral distance between an incident position of a target light and the first edge, wherein the target light is a light which is closest to the first edge and which is emitted to the display panel at an incident angle of a; c is a lateral distance between the boundary of the color filter layer 52a and the incident position in the critical state. Therefore, when d2≥b+c, the light with the angle α is emitted from a boundary of the display area of the display panel, and is not blocked by the supporting platform.

The maximum viewing angle is a maximum viewing angle at which the pixels at the boundary can be seen when a boundary of a display screen is viewed. When the viewing angle exceeds the maximum viewing angle, the light at the pixels at the boundary of the display screen cannot be transmitted to human eyes, so that pixel missing occurs.

The maximum viewing angle at at least one side of the display module is the maximum viewing angle when viewing a boundary on at least one side of the display screen. The "viewing angle" is an angle between a viewing direction and the thickness direction of the display panel 50. When d2 corresponding to a certain side of the accommodating space Va satisfies the above formula, when a user views the display screen at the viewing angle smaller than a at the side, light at the boundary of the display screen can enter human eyes without missing pixels at the boundary, so that the requirement of the medical display system for the display image quality can be satisfied.

In some embodiments, the "at least one side of the accommodating space Va" may include: two long sides of the accommodating space Va, that is, sides of the accommodating space Va close to the first retaining wall sidewalls 2111. Preferably, the "at least one side of the accommodating space Va" includes two long sides and two short sides of the accommodating space Va. That is, d2 corresponding to the four sides of the accommodating space Va satisfy the above formula, and at this time, when each boundary of the display screen is viewed at a viewing angle of α or less, the pixel missing cannot occur.

The above mentioned a may be set according to the actual requirement. In some embodiments, α is 45°, and a value range of d2 may be determined according to the above formula.

In some embodiments, t1 is 0.4 mm, t2 is 0.358 mm, t3 is 1.1 mm, the accumulated tolerance T is 0.33 mm; when n is 1.52 and α is 45°, d2 is set to be greater than or equal to 1.53 mm, e.g., d2 may be set to be 1.57 mm.

Figure 19:
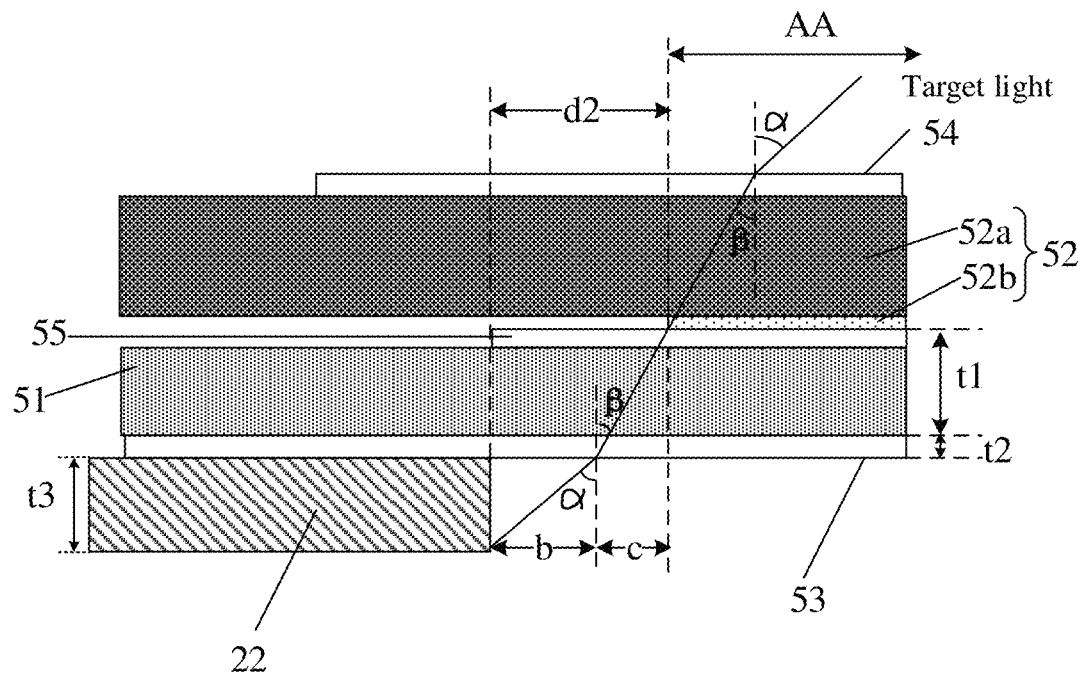
FIG. 19 is a schematic diagram illustrating light outgoing from a boundary of a display area of a display panel according to some embodiments of the present disclosure.

It should be noted that an optical path diagram shown in FIG. 18 schematically shows an example where the orthographic projection of the first polarizer 53 on the bottom wall 11 of the back plate may be located outside the orthographic projection of the supporting platform 22 on the bottom wall 11; in other embodiments, the orthographic projection of the first polarizer 53 on the bottom wall 11 of the back plate may also overlap with the orthographic projection of the supporting platform 22 on the bottom wall 11, where the light path of the boundary of the display area is as shown in FIG. 19, FIG. 19 is a schematic diagram illustrating light outgoing from a boundary of a display area of a display panel according to some embodiments of the present disclosure. The second distance d2 corresponding to at least one side of the accommodating space Va is determined according to the following formula (2):

$$d2 \geq t3*\tan\alpha + (t1+t2)*\tan\left(\arcsin\left(\frac{\sin\alpha}{n}\right)\right) + T \quad (2)$$

The parameters are as described above, and are not described in detail here.

In some embodiments, as shown in FIGS. 15 to 17, the supporting portion 22 of the frame is located above the optical film 30, an orthographic projection of the optical film 30 on a plane where the bottom wall 11 is located overlaps with an orthographic projection of the supporting portion 22 on the plane where the bottom wall 11 is located, and a width of the overlapped area is greater than or equal to 0.8 mm, so that stable arrangement of the optical film 30 can be ensured. In addition, the width of the overlapped area may also be less than or equal to 3 mm, so as to realize the narrow frame. For example, the width of the overlapped area is 0.8 mm or 1.0 mm or 1.5 mm or 1.7 mm or 2 mm or 2.5 mm or 3 mm. Here, "the width of the overlapped area is greater than or equal to 0.8 mm", which means, for example, that a width of each portion in the overlapped area is greater than or equal to 0.8 mm.

In one specific example, at a position corresponding to the first sub-sidewall 1211, i.e., the cut-away position shown in FIG. 15, a width of the overlapped area of projections of the optical film 30 and the supporting portion 22 may be 1.7 mm. At the position corresponding to the insert 23, i.e. the cut-out position shown in FIG. 16, the width of the overlapped area of the projections of the optical film 30 and the supporting portion 22 may be 1.0 mm. At a position corresponding to the slot 121v, i.e., the cut-away position shown in FIG. 17, the width of the overlapped area of projections of the optical film 30 and the supporting portion 22 may be 2.6 mm.

As shown in FIGS. 15 to 17, the display module may further include: a pressing part 63 and a light shielding tape 70, wherein the pressing part 63 is positioned on a side of the shielding part 62 facing the display panel 50 and is used for fixing the display panel 50. The light shielding tape 70 connects the back plate sidewall 121, the front frame sidewall 61, and the retaining wall sidewall 211 to prevent light leakage. The light shielding tape 70 is connected to at least the second sub-sidewall 1212 of the back plate sidewall 121.

It should be noted that in the embodiment of the present disclosure, the description of the numerical value range such as "m1 to m2" includes end point values m1 and m2.

Figure 20:
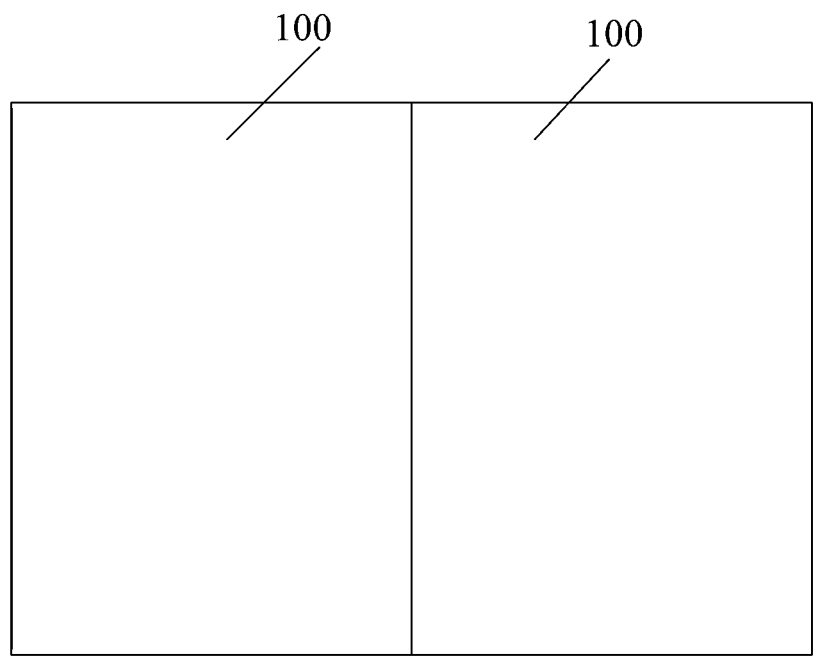
FIG. 20 is a schematic diagram of a medical spliced display system according to some embodiments of the present disclosure.

FIG. 20 is a schematic diagram of a medical spliced display system according to some embodiments of the present disclosure. As shown in FIG. 20, the medical spliced display system includes a plurality of display modules spliced together, where each display module employs the display module in the above embodiments. For example, the medical spliced display system can be used to display diagnostic images in the medical diagnosis.

At least two display modules are arranged side by side along a direction along which the short side of each display module extends and are spliced together. For example, as described above, each display module includes a plurality of first retaining wall sidewalls 2111 extending in a first direction and a plurality of second retaining wall sidewalls 2112 extending in a second direction, and a length of each first retaining wall sidewall 2111 is greater than that of each second retaining wall sidewall 2112, in which case, the at least two display modules are arranged along the second direction. In order to reduce the width of the sliced seam in the sliced system, the thicknesses of the first retaining wall sidewalls 2111 or thicknesses of other members at the sliced seam can be reduced; and the inserts 23 are arranged on the first retaining wall sidewalls 2111, the width of the sliced seam can be reduced while the structural stability of the display module is ensured.

The first direction may be the height direction of the medical spliced display system in use.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display module, comprising:
a display panel;
a back plate, comprising a bottom wall and a side frame connected to each other to define an accommodating space; and
a frame, comprising a retaining wall and a supporting platform on the retaining wall, wherein at least a portion of the retaining wall surrounds the side frame; the supporting platform extends toward the inside of the accommodating space and is configured to support the display panel; the frame further comprises an insert connected to the retaining wall, and the insert is on a side of the side frame facing the accommodating space, to embed the side frame between the retaining wall and the insert;
wherein the retaining wall comprises a plurality of retaining wall sidewalls on different sides of the accommodating space, respectively, and at least one of the plurality of retaining wall sidewalls is provided thereon with the insert and comprises at least one notch portion opposite to the insert thereon; and the side frame comprises a plurality of back plate sidewalls on different sides of the accommodating space, respectively; at least one of the plurality of back plate sidewalls comprises a first sub-sidewall and a second sub-sidewall connected to each other, the first sub-sidewall is opposite to a corresponding retaining wall sidewall, the second sub-sidewall is opposite to the insert, and at least a portion of the second sub-sidewall is in the notch portion.

2. The display module according to claim 1, wherein a surface of the first sub-sidewall facing the accommodating space and a surface of the second sub-sidewall facing the accommodating space are on two planes, respectively; and the two planes have a first distance therebetween, and the first distance is between 0.5 mm and 1 mm.

3. The display module according to claim 1, wherein a surface of the second sub-sidewall facing away from the accommodating space and a surface of the retaining wall sidewall facing away from the accommodating space are substantially on a same plane.

4. The display module according to claim 1, wherein the plurality of retaining wall sidewalls comprise: a plurality of first retaining wall sidewalls extending along a first direction and a plurality of second retaining wall sidewalls extending along a second direction, the first direction intersects the second direction, and a length of each first retaining wall sidewall is greater than a length of each second retaining wall sidewall; and
the insert is only on the first retaining wall sidewall.

5. The display module according to claim 4, wherein the plurality of first retaining wall sidewalls comprise two first retaining wall sidewalls arranged side by side in the second direction, and each first retaining wall sidewall is provided with the insert thereon; and
positions where the inserts are provided on the two first retaining wall sidewalls are mirror-symmetric with respect to a reference axis extending along the first direction.

6. The display module according to claim 4, wherein the insert of the frame comprises a plurality of insert groups, each insert group comprises at least one insert, and the at least one insert in a same insert group is opposite to a same second sub-sidewall.

7. The display module according to claim 6, wherein each insert group comprises at least two inserts disposed at intervals; and a farthest distance between two inserts farthest from each other in each insert group is greater than or equal to 24 mm.

8. The display module according to claim 6, wherein multiple insert groups are on each first retaining wall sidewall.

9. The display module according to claim 8, wherein on each first retaining wall sidewall, a distance from one end of the first retaining wall sidewall to a center of an insert group adjacent to the one end and a distance from the other end of the first retaining wall sidewall to a center of an insert group adjacent to the other end are both in a range from $\frac{1}{10}$ to $\frac{1}{4}$ times of H; and a center-to-center distance between any two adjacent insert groups is in a range from $\frac{1}{5}$ to $\frac{1}{2}$ times of H; and
wherein H is the length of the first retaining wall sidewall.

10. The display module according to claim 8, wherein on each first retaining wall sidewall, a distance from one end of the first retaining wall sidewall to a center of an insert group adjacent to the one end and a distance from the other end of the first retaining wall sidewall to a center of an insert group adjacent to the other end are both less than or equal to 100 mm; and a center-to-center distance between any two adjacent insert groups is less than or equal to 150 mm.

11. The display module according to claim 8, wherein on each first retaining wall sidewall, a distance from one end of the first retaining wall sidewall to a center of an insert group adjacent to the one end and a distance from the other end of the first retaining wall sidewall to a center of an insert group adjacent to the other end are both less than or equal to 100 mm; and a center-to-center distance between any two adjacent insert groups is in a range from ⅕ to ½ times of the length of the first retaining wall sidewall.

12. The display module according to claim 8, wherein the insert groups are uniformly distributed on each first retaining wall sidewall.

13. The display module according to claim 1, wherein the insert comprises a first insert portion and a second insert portion extending towards the bottom wall; and
a thickness of the second insert portion gradually becomes smaller as getting closer to the bottom wall.

14. The display module according to claim 13, wherein the second insert portion has a height in a range from ⅓ to ½ of a height of the insert.

15. The display module according to claim 1, wherein a slot is provided at an end of the second sub-sidewall away from the bottom wall; and
the display module further comprises an optical film comprising a main part and a lug on the main part; the main part is in the accommodating space, and the lug is inserted into the slot.

16. The display module according to claim 15, wherein a depth by which the lug is inserted into the slot is greater than or equal to a half of a thickness of the second sub-sidewall.

17. The display module according to claim 15, wherein an orthographic projection of the optical film on a plane where the bottom wall is located and an orthographic projection of the supporting platform on the plane where the bottom wall is located are overlapped with each other, and a width of an overlapped area is greater than or equal to 0.8 mm.

18. The display module according to claim 15, wherein the optical film further comprises an avoidance notch on the main part; and a portion of the insert is in the avoidance notch.

19. The display module according to claim 1, wherein a surface of the bottom wall facing away from the accommodating space is provided thereon with a first reinforcing rib and a plurality of second reinforcing ribs which are not overlapped with each other; the first reinforcing rib has a first annular boundary, and the second reinforcing ribs have second annular boundaries, each of which is within an area surrounded by the first annular boundary; and
wherein the display module is vertical display module which has a height greater than its width in use; and the plurality of second reinforcing ribs comprise: a second top reinforcing rib, a second bottom reinforcing rib, and a plurality of second middle reinforcing ribs, and the second top reinforcing rib and the second bottom reinforcing rib are on two sides of the plurality of second middle reinforcing ribs along a height direction of the display module, respectively.

20. The display module according to claim 1, wherein the display panel comprises: an array substrate, an opposite substrate, a liquid crystal layer and a first polarizer; the opposite substrate is on a side of the array substrate facing away from the bottom wall of the back plate; and the liquid crystal layer is between the array substrate and the opposite substrate; the first polarizer is on a side of the array substrate facing the bottom wall, and an orthographic projection of the first polarizer on the bottom wall does not overlap with an orthographic projection of the supporting platform on the bottom wall; and
the supporting platform has a first edge away from the retaining wall, and an orthographic projection of the first edge on the bottom wall surrounds an orthographic projection of a display area on the bottom wall; the orthographic projection of the first edge on the bottom wall and the orthographic projection of the display area on the bottom wall have a second distance therebetween; and the second distance d2 corresponding to at least one side of the accommodating space satisfies:

$$d2 \geq (t3 - t2) * \tan\alpha + (t1 + t2) * \tan\left(\arcsin\left(\frac{\sin\alpha}{n}\right)\right) + T$$

where α is the maximum visual angle on at least one side of the display module;
t1 is a sum of thicknesses of the array substrate and the liquid crystal layer; t2 is a thickness of the first polarizer; t3 is a thickness of the supporting platform;
n is a refractive index of a substrate of the array substrate; and
T is an accumulated tolerance of the display module during production, and T≥0.33.

21. The display module according to claim 20, wherein α is 45°.

22. The display module according to claim 1, wherein the display panel comprises: an array substrate, an opposite substrate and a first polarizer; the opposite substrate is on a side of the array substrate facing away from the bottom wall of the back plate; and the first polarizer is on a side of the array substrate facing the bottom wall; the supporting platform has a first edge away from the retaining wall, and an orthographic projection of the first edge on the bottom wall surrounds an orthographic projection of a display area on the bottom wall; the orthographic projection of the first edge on the bottom wall and the orthographic projection of the display area on the bottom wall have a second distance therebetween; and
wherein in the case that α is 45° and n is 1.52, the second distance d2 corresponding to at least one side of the accommodating space is greater than or equal to 1.53 mm; α is the maximum visual angle on at least one side of the display module; and n is a refractive index of a substrate of the array substrate.

23. The display module according to claim 1, wherein at least a portion of each retaining wall sidewall is on a side of the side frame facing away from the accommodating space;
the display module further comprises a front frame comprising a plurality of front frame sidewalls, and a shielding part connected to the plurality of front frame sidewalls; the plurality of front frame sidewalls surround the frame; the shielding part is on a side of the display panel facing away from the bottom wall, an orthographic projection of the shielding part on the display panel is in a peripheral area of the display panel; and
wherein an outer boundary of the shielding part corresponding to the retaining wall sidewall provided with the insert and a boundary of a display area have a third distance therebetween, and the third distance is between 4.8 mm and 5.6 mm.

24. A medical spliced display system, comprising a plurality of display modules spliced together, wherein each display module is the display module according to claim 1.

25. The medical spliced display system according to claim 24, wherein
the plurality of retaining wall sidewalls comprise: a plurality of first retaining wall sidewalls extending along a first direction and a plurality of second retaining wall sidewalls extending along a second direction, the first direction intersects the second direction, and a length of each first retaining wall sidewall is greater than a length of each second retaining wall sidewall;
the insert is only on the first retaining wall sidewall; and
at least two of the plurality of display modules are arranged along the second direction and spliced together.

\* \* \* \* \*

UNITED STATES PATENT AND TRADEMARK OFFICE
CERTIFICATE OF CORRECTION

PATENT NO. : 12,174,474 B2  
APPLICATION NO. : 18/037308  
DATED : December 24, 2024  
INVENTOR(S) : Xin Gai et al.

Page 1 of 1

It is certified that error appears in the above-identified patent and that said Letters Patent is hereby corrected as shown below:

On the Title Page

Item (72) Inventors: please delete the name of the sixth Inventor "Wengian Luo" and replace with "Wenqian LUO".

Signed and Sealed this  
Twenty-ninth Day of July, 2025

Coke Morgan Stewart  
*Acting Director of the United States Patent and Trademark Office*